United States Patent Office

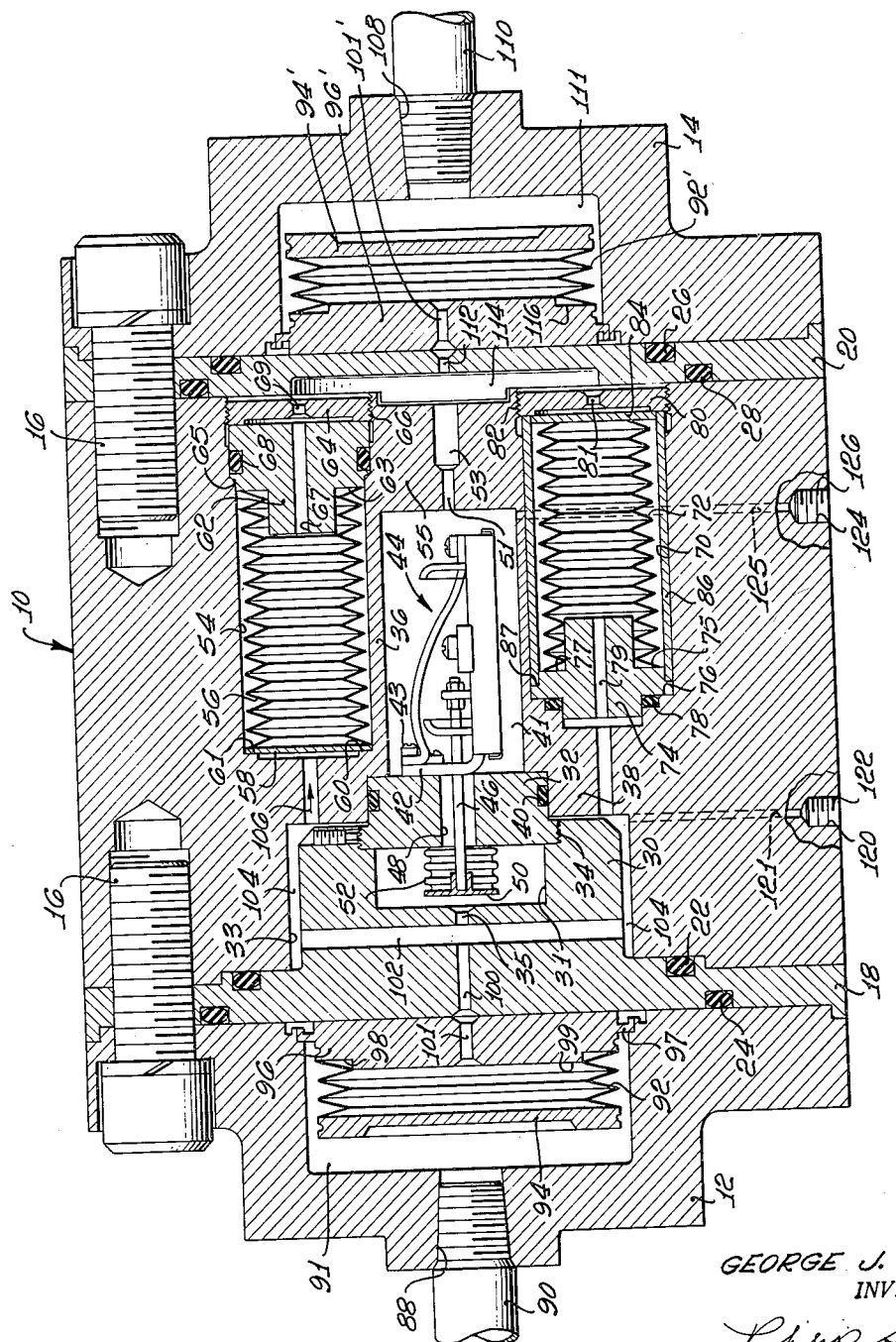

3,058,350
Patented Oct. 16, 1962

3,058,350
DIFFERENTIAL PRESSURE TRANSDUCER
George J. Brown, Riverside, Calif., assignor to Statham Instruments, Inc., Los Angeles, Calif., a corporation of California
Filed Oct. 6, 1959, Ser. No. 844,658
9 Claims. (Cl. 73—407)

This invention relates to a differential pressure transducer which can be subjected to high overloads without adversely affecting the instrument.

In differential pressure transducers, particularly where high line pressures are employed, the danger exists of the application of an overload on the instrument beyond the maximum safe differential pressure range of the instrument. This is especially true where the maximum differential pressure range of the instrument is substantiallly less than the line pressure. Under these circumstances, where the transducer is, for example, an unbonded strain gage, such overload may cause a rupture of the strain wire, thus damaging the instrument.

It is an object of this invention to design a differential pressure transducer having means preventing damage to the instrument as result of overload.

Another object is the provision of a differential pressure transducer which permits application of overloads up to the maximum rated line pressure, regardless of the differential pressure range of the instrument, without impairing the device.

Other objects and advantages will be apparent from the following description of the invention.

According to an embodiment of the invention, a pair of isolation bellows are positioned adjacent opposite pressure inlets. The other side of one of the first bellows from the adjacent pressure inlet communicates through fluid channels with one side of a sensing diaphragm which is connected to a sensing element such as a strain wire transducer, and also communicates with one side of a first pre-loaded bellows and with one side of a second reversely positioned pre-loaded bellows.

The other side of the second isolation bellows from its adjacent pressure inlet communicates through fluid channels with the other side of the sensing diaphragm, and also communicates with the other side of the first pre-loaded bellows and the other side of the second pre-loaded bellows.

The pre-loaded bellows are spring loaded so that they are normally in expanded position up to the safe differential load for the instrument.

If an overload is applied via the first pressure inlet to the first isolation bellows, this causes the first pre-loaded bellows to collapse, permitting fluid from the first isolation bellows to be introduced into the cavity around the first pre-loaded bellows. When the first pre-loaded bellows collapses, fluid from the inside of the first pre-loaded bellows enters the second isolation bellows to cause it to expand. In completely collapsed position of the first isolation bellows, the end plate thereof abuts a rigid plate and no greater pressure can be transmitted by the collapsed isolation bellows regardless of the magnitude of such pressure, and the sensing diaphragm is thus not subjected to any pressure above that which has caused complete collapse of the first isolation bellows.

When the overload is removed, the spring loaded or pre-loaded bellows returns to its initial position, returning fluid to the first isolation bellows and causing the first isolation bellows to expand back to its initial normal position, while fluid from the second isolation bellows is transferred back into the pre-loaded bellows.

Exactly the same operation occurs when the overload is applied to the second isolation bellows, except here the second isolation bellows and the second pre-loaded bellows collapse and fluid is introduced into the first isolation bellows. When the overload is removed, the second pre-loaded bellows expands to its initial position, transmitting fluid back into the second isolation bellows and causing it to expand to its initial normal position.

The invention will be more clearly understood by reference to the description below of a preferred embodiment, taken in connection with the accompanying drawing showing a longitudinal cross section of the instrument.

Referring to the drawing, numeral 10 represents a cylindrical case of substantial thickness to withstand high pressures, and to which is connected at its opposite ends a pair of pressure caps 12 and 14 by means of screws 16. A plate 18 is clamped between pressure cap 12 and the case 10, an O-ring seal 22 being provided between plate 18 and the case 10 and another O-ring seal 24 being provided between plate 18 and the cap 12. In a similar manner a plate 20 is clamped between the pressure cap 14 and the case 10, an O-ring seal 26 being provided between plate 20 and cap 14 and another O-ring seal 28 being provided between plate 20 and the case 10.

A block 30 having a central recess or cavity 31 is mounted at one end within the bore 33 of the case 10, the block 30 being threadably connected at 34 to a fitting 32. A housing 36 is provided which has a flange 38 at its inner end, the interior surface of said flange being tightly fitted over the outer end portion of the fitting 32. An O-ring 40 is provided between fitting 32 and the flange 38. Mounted in the interior 41 of the housing 36 is a transducer in the form of an unbonded strain wire transducer, indicated generally by the numeral 44, such transducer being supported on a bracket 42 connected by means of screws 43 to the fitting 32. Transducer 44 is of the type well known in the prior art, such transducer being shown and described in U.S. Patent No. 2,573,286. A rod or linkage 46 connects the transducer with the disc 50 at one end of a sensing bellows 52, the rod 46 passing through an aperture 48 in the fitting 32 to permit displacement of member 46 by the sensing bellows 52.

It will, of course, be understood that in place of a bellows such as 52 any other equivalent form of diaphragm can be employed. The outer end portion 55 of the housing 36 has intercommunicating passages 51 and 53, which communicate the interior of the housing 36 with the exterior space 114.

A longitudinally extending pocket 54 is provided in the instrument between the case 10 and member 36. Positioned within the pocket 54 is a bellows 56, which in normal position is expanded and pre-loaded, as will be described more fully below, so that the end plate 58 of bellows abuts shoulders 60 and 61 formed on flange 38 of housing 36 and on the interior surface of the case 10. The opposite end of the bellows abuts the interior surface 63 of a plug 62 which seats against a shoulder 65 at the opposite end of the pocket 54. A plate 64 is threadably mounted at 66 in the outer end of the pocket to abut plug 62 and maintain the plug in tight position against the shoulder 65. A central passage 67 is provided through the plug 62, and a communicating central passage 69 is formed in the plate 64. Passages 67 and 69 provide communication between the interior of the bellows 56 and the outer space 114. An O-ring 68 is provided between the plug 62 and the adjacent surfaces of members 36 and 10.

Also formed in the interior of the instrument, substantially directly opposite pocket 54, is a second longitudinally extending pocket 70 having a bellows 72 which is preloaded the same amount as bellows 56, as described more fully below, positioned within said pocket. Bellows 72 is substantially the same as bellows 56 in construction and in size. The bellows 56 and 72 are parallel. However, bellows 72 is positioned in reverse to bellows 56. A plug 74 is positioned in the inner end of the pocket 70, and the open end 75 of bellows 72 abuts the surface 77 of the plug, maintaining it in position with the O-ring seal 78 positioned between the plug and the adjacent interior surface of the case 10. The bellows end plate 84 at the opposite end of bellows 72 is maintained in position by abutting the adjacent surface of the mounting plate 80, which is threadably connected at 82 in the outer end of the pocket 70. The mounting plate 80 abuts one end of a sleeve 86 positioned in the pocket, the opposite end of the sleeve being positioned against a shoulder 87 of plug 74 to positively maintain the plug 74 in position. A central aperture 79 is provided in the plug 74 for communicating the interior of the bellows 72 with certain external passages as described more fully below.

A fluid pressure inlet 88 is provided in the pressure cap 12 for threadable attachment of a pressure fitting 90. The pressure inlet 88 communicates with a cavity 91 in the interior of the pressure cap 12. Mounted in the cavity 91 is an isolation bellows 92 having a dished end plate 94 at one end and connected at its other end to a support plate 96 which is clamped at its peripheral base portion 97 between the base of the pressure cap 12 and the plate 18. The bellows 92 is attached to plate 96 adjacent a peripheral recess 98 therein, so that when the bellows is completely collapsed the corrugations of the bellows will fill recess 98 and the surface of the dished end plate 94 of the bellows will be in flat physical contact with the outer surface 99 of plate 96.

A channel 101 is axially provided through the plate 96, said channel communicating with the interior of bellows 92 and with a passage or channel 100 axially formed in the plate 18, which in turn communicates with a transversely extending channel 102 in the block portion 30 of the plate 18. Channel 102 communicates at its opposite ends with an annular channel 104 formed by spacing the block portion 30 of plate 18 a short distance away from the adjacent interior surface of the bore 33. The channel 104 in turn communicates with another annular channel 106 which is provided by spacing the flange 38 of the housing 36 a short distance away from the adjacent interior surface of the case 10. Channel 106 communicates with the channel 79 formed in the plug 74, said channel 79, as previously noted, communicating with the interior of the bellows 72.

At the opposite end of the instrument in pressure cap 14 is provided a pressure inlet 108 in which a pressure fluid fitting 110 is adapted to be threadably secured. The pressure inlet 108 communicates with the cavity 111 in the interior of cap 14. Mounted within the cavity 111 is an isolation bellows assembly which is exactly the same in structure as the bellows assembly at the other end of the instrument, including the isolation bellows 92. Since the isolation bellows assembly at the right end of the instrument viewing the drawing is structurally the same as that of the isolation bellows assembly at the left end of the instrument, the various component parts of the former bellows assembly are indicated by primed numbers corresponding to the parts of the other isolation bellows assembly. Hence it will be seen that the interior of the isolation bellows 92' is in communication with a central channel 101' provided in the plate 96', and said channel 101' in turn communicates with an axially positioned channel 112 formed in the plate 20, which extends to the space 114 between the outer end portion 55 of the housing 36 and the plate 20. The isolation bellows 92 and 92' are of the same size, so that they displace equal volumes of fluid during operation of the instrument, as will be noted below. The bellows 56 and 72, which are of the same size and fluid displacement volume, are pre-loaded so that, for differential pressures which are applied against the isolation bellows 92 and 92' of a magnitude within and up to the maximum safe rating for the transducer, the bellows 56 and 72 will remain in their fully expanded position shown in the drawing. However, when the differential pressure exceeds the maximum safe differential pressure for the transducer, the bellows 56 and 72 will collapse, as brought out in greater detail below.

A fill hole 120, provided with a fill hole stopper 122, permits a liquid to be introduced via channel 121 into bellows 92, communicating passages 101, 100, 102, 104, 106, 79, the interior of the bellows 72 and the pocket 54 exteriorly of bellows 56. Such liquid also fills the passage 35 and the cavity or recess 31 exteriorly of the sensing bellows 52. Another fill hole 124, provided with a stopper 126, permits introduction of liquid into interior space 41 of the housing 36, aperture 48 and the interior of the sensing bellows 52. Such liquid also fills bellows 92' and communicating passages 101', 112, 114, 81, 69, 67, the interior of bellows 56, pocket 70 exteriorly of bellows 72 and passages 53, 51. Sufficient clearance is provided between end plates 58 and 84 of bellows 56 and 72, respectively, and the adjacent side wall of the respective pockets 54 and 70, to permit liquid to flow past such end plates and around both bellows, as indicated above. It is thus seen that there are basically two closed fluid systems, the first closed system permitting transmission of fluid to and from the interior of the sensing bellows 92 and the interior of the bellows 72, and to and from the interior of bellows 92 and the pocket 54 exteriorly of the bellows 56. The first closed system also permits transmission of fluid pressure from the interior of bellows 92 against the exterior of the sensing diaphragm 52. The second closed fluid system permits transmission of fluid to and from the interior of bellows 92' and the interior of bellows 56, and to and from the interior of bellows 92' to the pocket 70 exteriorly of the bellows 72. The second closed system also permits transmission of fluid pressure from the bellows 92' via the fluid in the cavity 41 and passage 48 to the interior of the sensing bellows 52.

When there is no differential pressure applied to the pre-loaded bellows 56 or 72, that is, when the pressures against the isolation bellows 92 and 92' are equal, the position of these bellows is as shown in the drawing, with both of these bellows expanded an equal amount intermediate their fully expanded and fully collapsed position, with the same amount of fluid in each of these isolation bellows.

Now, assuming that a differential pressure is applied so that the pressure against the bellows 92 exceeds the pressure against the bellows 92', or vice versa, this differential pressure will be sensed by the sensing bellows 52, causing a displacement of linkage 46, resulting in a response from the transducer 44. While this differential pressure is within the range of the transducer, there will be no material displacement of the bellows 92 or 92', since bellows 56 and 72 are each pre-loaded to a value such that they will not collapse until the maximum safe differential pressure is attained.

It will be understood that where the pressure applied against bellows 92 is greater than that applied against bellows 92', displacement of linkage 46 is in one direction, that is, to the right, viewing the drawing, and when the pressure against bellows 92' is greater than against 92, displacement of linkage 46 is in the opposite direction.

Now, however, assuming that a differential pressure is applied at 90 which exceeds the maximum safe differential range for the transducer, the pressure applied against end plate 58 of the bellows 56 will exceed the pre-loaded pressure corresponding to the maximum safe differential pressure for the transducer, and the end plate 58 will move away and the bellows 56 will then collapse, permitting the isolation bellows 92 to collapse also until the dished end 94 of the bellows is flat against the plate 96. This produces a displacement of fluid from the interior of the bellows 92 through channels 101, 100, 102, 104 and 106 into the pocket 54 against end plate 58 of bellows 56. The bellows 56 is capable of being displaced sufficiently to provide enough space in pocket 54, to receive all of the fluid displaced from the interior of bellows 92. The fluid in bellows 56 which is thus displaced as result of collapse of the bellows 56 is forced through channels 67 and 69, space 114, and channels 112 and 101′ into the isolation bellows 92′ at the right, causing the latter to expand a volume equal to the volume of fluid displaced from bellows 92 as result of collapse thereof. It will be noted that the spring rate of the bellows 56 is substantially less than the spring rate of the transducer strain wires so that during collapse by excess pressure applied against end plate 84, of the bellows 56 there is essentially no increased pressure applied to the sensing bellows 52 and hence substantially no increased strain on the wires of the transducer. It will be observed that, during this period of collapse of the bellows 92 and 56, there is no effect on the bellows 72, which remains in its fully expanded position, since the pressure transmitted via passages 104 and 106 to the interior of bellows 72, together with the pre-loaded spring pressure of the bellows 72, is greater than the exterior pressure on bellows 72 transmitted by the fluid through passages 114 and 81.

Once the bellows 92 has been completely collapsed, so that the end plate 94 thereof flatly abuts the adjacent plate 96, it will be observed that any increased differential pressure against diaphragm 94 cannot be transmitted through the fluid in passages 101, 100 and 35 to the sensing diaphragm 52, even though such differential pressure approaches the high pressure magnitude of the line pressure, where the line pressure is substantially above the safe differential pressure for the instrument. Thus, for example, a differential pressure transducer according to the invention can be designed to permit application of extremely high overloads without impairing the usefulness of the instrument, e.g., causing the strain wires of the transducer to break as result of such overload. For example, an instrument according to the invention can be designed to have a range of from 1 p.s.i. differential to 3,000 p.s.i. differential, where the line pressure may be 5,000 p.s.i. gage. Hence the overload feature of the invention permits application of overloads up to the maximum rated line pressure regardless of differential range.

When the overload on the instrument is removed, the spring loaded bellows 56 returns to its normal, fully expanded position shown in the drawing, causing the fluid in pocket 54 to return via channels 106, 104, 102, 100 and 101 to the interior of the isolation bellows 92, to restore it to its initial normal position, which is the intermediate expanded position of such bellows shown in the drawing. As bellows 56 thus expands to its fully expanded position, fluid from the bellows 92′ passes from the interior of such bellows through channels 101′, 112, 114, 69 and 67 into the interior of bellows 56, causing bellows 92′ to be restored to its initial, partially expanded position shown in the drawing, the positions of bellows 92 and 92′ now being exactly the same, and these bellows containing the same volume of fluid as indicated above.

Now, assuming that the differential pressure applied is such that the pressure against bellows 92′ is greater than that against bellows 92, at differentail pressures below the safe maximum differential pressure for the transducer, the differential pressure against bellows 92′ will be transmitted via bellows 52 to the transducer, while bellows 92′ and 72 remain in their expanded position shown on the drawing. When an overload of such differential pressure is applied, the bellows 72, which is pre-loaded to remain in expanded position until an overload is applied, collapses, by excess pressure applied against end plate 84, permitting fluid from the interior of the bellows 92′ to be transmitted through passages 101′, 112, 114 and 81 into the pocket 70, against end plate 84, bellows 72 yielding sufficiently to provide enough space in pocket 70 to receive all of the fluid displaced from the interior of bellows 92′. The fluid thus displaced from the interior of bellows 72 as result of collapse thereof is transmitted via passages 79, 106, 104, 102, 100 and 101 into the isolation bellows 92. Such displacement of fluid continues until bellows 92′ is completely collapsed, so that the end plate 94′ thereof flatly abuts the adjacent surface of the plate 96′. At this time the same volume of fluid which has been displaced from bellows 92′ has been added to the volume of the fluid in bellows 92. Thereafter, as the overload increases against the bellows plate 94′, no further pressure will be transmitted via the passages 101′, 112, 114, 53, 51 and 48 against the sensing bellows 52 of the transducer, regardless of the magnitude of such overload. When the overload is removed from the bellows 92′, the bellows 72 will expand to its initial pre-loaded position shown in the drawing, displacing a corresponding amount of fluid from the pocket 70 exteriorly of bellows 72, and causing such fluid to pass through channels 81, 114, 112 and 101′ into the interior of bellows 92′ to cause the latter to expand to its normal position shown in the drawing. During expansion of the bellows 72, fluid from the interior of the isolation bellows 92 will be transmitted through channels 101, 100, 102, 104 106 and 79 to the interior of bellows 72, causing bellows 92 also to be restored to its initial position, so that both of the isolation bellows 92 and 92′ now contain the same volume of fluid.

While I have described particular embodiments of my invention for the purposes of illustration, it should be understood that various modifications and adaptations thereof may be made within the spirit of the invention as set forth in the appended claims.

I claim:

1. A differential pressure sensing device which comprises a sensing diaphragm, means connected to said diaphragm for sensing displacement thereof, a first isolation bellows, a second isolation bellows, a first pressure inlet to the exterior of said first isolation bellows, stop means adjacent the interior of said first isolation bellows, limiting the displacement of said bellows in a direction to collapse same, a second pressure inlet to the exterior of said second isolation bellows, stop means adjacent the interior of said second isolation bellows limiting the displacement of said second isolation bellows in a direction to collapse same, a first pre-loaded bellows loaded to a chosen maximum safe differential pressure to be sensed by said sensing diaphragm and applied against said first and second isolation bellows, a second pre-loaded bellows loaded to said chosen maximum safe differential pressure to be sensed by said sensing diaphragm and applied against said first and second isolation bellows, means communicating the interior of said first isolation bellows with one side of said sensing diaphragm and with the exterior of said first pre-loaded bellows and the interior of said second pre-loaded bellows, said last named means forming a first separate enclosed system, means communicating the interior of said second isolation bellows with the other side of said sensing diaphragm and with the exterior of said second pre-loaded bellows and the interior of said first pre-loaded bellows, said last mentioned means forming a second separate enclosed system, means for filling said device with fluid, a substantially incompressible fluid filling each of said enclosed systems of said device, said pre-loaded bellows each being displaceable sufficiently on application of a differential pressure against said isolation bellows greater than said maximum differential pressure, to provide sufficient space to receive all of the fluid discharged from the isolation bellows which has been displaced to its maximum displacement against the adjacent stop means.

2. A device as defined in claim 1, wherein said means for sensing displacement of said sensing diaphragm is a transducer, a connection between said sensing diaphragm and said transducer, the volume of said first and second isolation bellows being substantially the same in the fully expanded position thereof, said stop means each comprising a support plate, each of said plates, when contacted by the adjacent isolation bellows in collapsed condition thereof, preventing further displacement and transmission of additional fluid pressure by said last mentioned isolation bellows via said respective fluid systems against said sensing diaphragm.

3. A device as defined in claim 2, said second isolation bellows being fully expanded when said first isolation bellows and said first pre-loaded bellows are both completely collapsed, and said first isolation bellows being fully expanded when said second isolation bellows and said second pre-loaded bellows are both completely collapsed.

4. A differential pressure sensing device which comprises an enclosed housing, first and second pressure fluid inlet chambers spaced apart in said housing, a first isolation bellows positioned in said first chamber, a second isolation bellows positioned in said second chamber, first and second pre-loaded bellows positioned in first and second pockets, respectively, in said housing spaced from each other, a sensing diaphragm in said housing, passage means in said housing and providing two separate sealed fluid systems, incompressible fluid in each of said systems, said first system being enclosed between the interior of said first isolation bellows, one side of said sensing diaphragm and said first pocket exteriorly of said first pre-loaded bellows and the interior of said second pre-loaded bellows, said second system being enclosed between the interior of said second isolation bellows, the other side of said sensing diaphragm, the interior of said first pre-loaded bellows and the exterior of said second pre-loaded bellows, said pre-loaded bellows each being loaded to a chosen maximum safe differential pressure to be sensed by said sensing diaphragm and applied against said isolation bellows by the pressure fluid in said chambers, a stop adjacent each of said isolation bellows, said stops each limiting movement of the adjacent isolation bellows to a predetermined amount of displacement in a direction to collapse said bellows on application of a differential pressure against said last mentioned bellows in excess of said maximum differential pressure, said first and second pre-loaded bellows each being capable of sufficient displacement to provide a space in said first and second pockets, respectively, to receive all of the fluid discharged from said first and second isolation bellows, respectively, during maximum displacement thereof.

5. A differential pressure sensing device as defined in claim 4, wherein said sensing diaphragm is a bellows, the exterior of which is in communication with said first isolation bellows, and the interior of which is in communication with said second isolation bellows.

6. A differential pressure sensing device as defined in claim 4, wherein each of said stops is a plate which limits displacement of the adjacent isolation bellows in a direction collapsing same, the collapse of the respective isolation bellows against its adjacent plate preventing transmission of a fluid pressure greater than said maximum differential pressure by the collapsed isolation bellows and via said passage means against said sensing diaphragm.

7. A differential pressure sensing device as defined in claim 4, wherein the interior of each of said isolation bellows has sufficient capacity to provide a space sufficient to receive all of the fluid discharged from the interior of the pre-loaded bellows with which it is in communication during collapse of said last mentioned bellows.

8. A differential pressure sensing device as defined in claim 4, wherein said isolation bellows are positioned at opposite ends of said housing, and said pre-loaded bellows and said sensing diaphragm are positioned in said housing between said isolation bellows.

9. A differential pressure sensing device which comprises a sensing diaphragm, means connected to said diaphragm for sensing displacement thereof, a first isolation diaphragm, a second isolation diaphragm, a first pressure inlet to one side of said first isolation diaphragm, stop means adjacent the other side of said first isolation diaphragm, said stop means limiting displacement of said diaphragm in a direction away from said first pressure inlet, a second pressure inlet to one side of said second isolation diaphragm, stop means adjacent the other side of said second isolation diaphragm, said last mentioned stop means limiting displacement of said second isolation diaphragm in a direction away from said second pressure inlet, a first diaphragm loaded to a chosen maximum safe differential pressure to be sensed by said sensing diaphragm and applied against said first and second isolation diaphragms, a second pre-loaded diaphragm loaded to said chosen maximum safe differential pressure to be sensed by said sensing diaphragm and applied against said first and second isolation diaphragms, means providing communication from the other side of said first isolation diaphragm with one side of said sensing diaphragm and with one side of each of said pre-loaded diaphragms, said last named means forming a first separate enclosed system, means providing fluid communication from the other side of said second isolation diaphragm with the other side of said sensing diaphragm, and with the other side of each of said pre-loaded diaphragms, said last mentioned means forming a second separate enclosed system, means for filling said first and second enclosed systems with fluid, said first and second pre-loaded diaphragms each being displaceable sufficiently on application of a differential pressure against said isolation diaphragms greater than said maximum differential pressure, to provide sufficient space to receive all of the fluid displaced from said other side of the said first and second isolation diaphragms, respectively, when the latter diaphragms have been displaced to their maximum displacement against their adjacent stop means.

References Cited in the file of this patent

UNITED STATES PATENTS

| 2,276,580 | Hofer | Mar. 17, 1942 |
| 2,466,071 | Barnes et al. | Apr. 5, 1949 |
| 2,713,097 | Wooten | July 12, 1955 |